(12) United States Patent
Mummert et al.

(10) Patent No.: US 6,907,607 B1
(45) Date of Patent: Jun. 14, 2005

(54) SYSTEM AND METHOD FOR ANALYZING CAPACITY IN A PLURALITY OF PROCESSING SYSTEMS

(75) Inventors: Lily Barkovic Mummert, Mahopac, NY (US); William G. Pope, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/690,872

(22) Filed: Oct. 17, 2000

(51) Int. Cl.[7] .................................................. G06F 9/46

(52) U.S. Cl. ...................... 718/104; 718/100; 718/102

(58) Field of Search ................................. 718/100, 102, 718/104, 105; 709/224, 229; 705/8

(56) References Cited

U.S. PATENT DOCUMENTS

| | | | | |
|---|---|---|---|---|
| 5,408,663 A | * | 4/1995 | Miller | 718/104 |
| 5,530,557 A | * | 6/1996 | Asit et al. | 386/125 |
| 5,548,506 A | * | 8/1996 | Srinivasan | 705/8 |
| 6,427,152 B1 | * | 7/2002 | Mummert et al. | 707/102 |
| 6,516,348 B1 | * | 2/2003 | MacFarlane et al. | 709/224 |
| 6,571,215 B1 | * | 5/2003 | Mahapatro | 705/8 |
| 2001/0054097 A1 | * | 12/2001 | Chafe | 709/224 |
| 2003/0061362 A1 | * | 3/2003 | Qiu et al. | 709/229 |
| 2003/0133417 A1 | * | 7/2003 | Badt, Jr. | 370/254 |
| 2003/0167151 A1 | * | 9/2003 | Ding et al. | 702/186 |
| 2003/0236745 A1 | * | 12/2003 | Hartsell et al. | 705/540 |

OTHER PUBLICATIONS

Lo, Leo, "The Evolution of Workload Managment in Data Porcessing Industry: A Survey", IEEE Nov. 1999.*
"The Use of Life Expectancy to Manage Notes Domino E–Mail Storage", Proceeding of the Computer Measurement Group, CMG '99, Dec. 1999.*

* cited by examiner

Primary Examiner—Meng-Al T. An
Assistant Examiner—Lilian Vo
(74) Attorney, Agent, or Firm—Thu Ann Dang; Anne V. Dougherty

(57) ABSTRACT

A system and method for projecting capacity of computer resources for a plurality of processing systems in a processing environment and for adjusting workload among said systems to improve resource utilization. An administrative processor determines the projected usage of computer resources for a plurality of computer systems in a processing environment by representing the capacity of each of the plurality of computer systems in a normalized unit and by sorting the capacities of the computer systems by the normalized or standardized units. The standardized unit, optimally time as measured as the life expectancy of each different resource of the computer system, is used for the N-axes of the N-dimensional space called a capacity space. Each computer system is mapped to a point in the capacity space, which normalizes configuration and capacity differences between systems by expressing the usage of all resources in the units of time. Once the normalized values have been defined and sorted, the administrative processor can make adjustments to the workload among the plurality of processing systems to improve the utilization of the capacity of the greatest number of processing systems in the processing environment.

16 Claims, 6 Drawing Sheets

SYSTEM AND METHOD FOR ANALYZING CAPACITY IN A PLURALITY OF PROCESSING SYSTEMS

FIELD OF THE INVENTION

The invention relates generally to the field of computer systems and more particularly to a system and method for optimizing computer resource usage across a plurality of computer systems.

BACKGROUND OF THE INVENTION

In the capacity planning process, system parameters, desired service levels, and workload predictions are used to determine when the resources of a computer system will be exceeded and are used to assist in identifying cost-effective remedies to resource shortfalls. "Capacity Planning and Performance Modeling: From Mainframes to Client-Server Systems", by Daniel A. Menasce, Virgilio A. Almedia, and Larry W. Dowdy (Prentice Hall, Englewood Cliffs, N.J., 1994) discloses approaches to both the predicting and rectifying of computer resource challenges.

Capacity planning for a set of heterogeneous computer systems presents several problems, as set forth below. As a first challenge, it must be recognized that workloads use multiple resources. Therefore, the effect of workload assignment is not readily predicted or quantified. Second, workload typically grows, and the rate of growth may differ between resources. Third, different computer systems may have different resources, and different resource capacities. These problems can make it difficult to determine how long available resources will last, which computer systems are most at risk for exceeding their resources, how to reallocate resources to alleviate shortages, and how the computer systems will be affected by such reallocations.

Dan Asit and Dinkar Sitaram, in U.S. Pat. No. 5,530,557, entitled "Online Placement of Video Files Determined by a Function of the Bandwidth to Space Ratio of each of the Storage Device in a Server Environment", (Jun. 25, 1996) teach one solution for maximizing storage utilization for the placement of videos on storage devices taking into account the expected demand for the video. Asit, et al use the bandwidth space ratio (BSR) to place videos on disks. The BSR of a disk is its bandwidth divided by space. The BSR of a video is the expected demand for the video divided by the space required to store it. Deman may be forecast based on historical usage data and, in their invention, a Video Placement Manager places the videos on the disks to match the BSR of the videos with the BSR of the disk.

Additional references which have sought to predict and manage storage capacity include an article and related patent application of W. G. Pope and Lily Mummert. The article entitled "The Use of Life Expectancy to Manage Notes Domino E-Mail Storage", Proceedings of the Computer Measurement Group, CMG '99, December 1999, and the patent application Ser. No. 09/457,467 entitled "System and Method for Providing Property Histories of Objects and Collections For Determining Device Capacity Based Thereon", which was filed on Dec. 8, 1999, propose a method for projecting device capacity by past history of access to and usage of the relevant information for a single computer system.

What is still needed however, and what is an objective of the present invention, is a method for analyzing capacity constraints for multiple resources of a plurality of computer systems.

Another objective of the present invention is to identify critical system limitations which may then be targeted in reallocating resources to alleviate shortages.

SUMMARY OF THE INVENTION

The foregoing and other objectives are realized by the present invention comprising a system and method for projecting usage of computer resources for a plurality of computer systems in a processing environment by representing the capacity of each of the plurality of computer systems in a normalized unit and by sorting the capacities of the computer systems by the normalized or standardized units.

The standardized unit, optimally time as measured as the life expectancy of each different resource of the computer system, is used for the N-axes of the N-dimensional space called a capacity space. Each computer system is mapped to a point in the capacity space, which normalizes configuration and capacity differences between systems by expressing the usage of all resources in the units of time.

The inventive method includes the step of calculating the life expectancy of each resource in a system, identifying at least one critical resource as the at least one resource having the shortest life expectancy, defining the life expectancy of the system as the life expectancy of the at least one critical resource, and sorting all systems' life expectancies from shortest to longest. The workloads of those systems having the shortest life expectancies will be adjusted to more efficiently distribute the workloads and to improve the projected resource usages for the computer systems in the processing environment.

At least one administrative processor of the processing environment gathers the configuration and usage information, maps the capacity space for each system, and identifies the critical resources and the critical times for addressing workload needs for the computer systems of the processing environment. Once the critical resources have been identified, workload assignment can be more equitably made to improve resource usage.

BRIEF DESCRIPTION OF THE DRAWINGS

The invention will now be described in greater detail with specific reference to the appended drawings wherein.

DETAILED DESCRIPTION OF THE INVENTION

Figure 1:
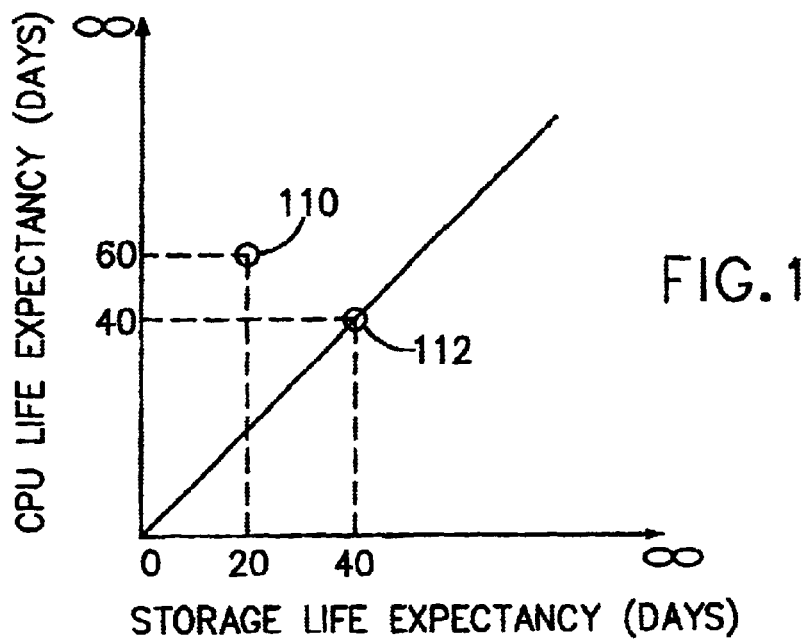
FIG. 1 provides a graph illustrating the mapping of capacity space for two resources of a computer system in units of time in accordance with the present invention.

For the ensuing description of the invention, the following terms will be used:

An administrative processor is a computer system with the capability to execute computer software and programs. Here the term administrative processor refers to hardware including at least a central processing unit along with the memory and input/output interfaces for transferring digital data between the inside of the system and the outside world and the operating and support software, i.e. operating system and support subsystems that allow the hardware devices to be used. The term administrative processor is not meant to include any devices for the permanent storage of data. The administrative processor may be part of a separate processing system (as shown in FIG. 1) or may be a component of one of the processing systems in the processing environment for which the workload analysis is to be conducted. More than one administrative processor can serve a single processing environment.

A repository is a means for storing structured data external to the administrative processor. Data in the repository is saved and accessed in a storage subsystem but is also supported by software, such as relational database software, that provides access to the structure of the data. Database software is not essential for a repository as the content of the repository can be stored in simpler storage objects, frequently called a flat file.

A processing system is a computing system that includes all the hardware and software needed to execute computer programs. This includes the central processing unit (CPU) or multiple CPUs, memory, storage and network connectivity as well as the operating system, application software and procedures for managing work on the system.

Workload is the set of identifiable tasks that execute in the processing system and utilize or consume the resources of the system.

A workload unit is a subset of the workload that can be associated with some external identifier (e.g., the collection of all tasks executed by an employee user.) Workload units are a collection point for keeping historical records about resource consumption and act as a means to allocate workload to a specific processing system. Workload units may execute anywhere in the processing environment, subject only to resource constraints.

A container is a generalized term that represents an identifiable and limited part of a resource that has a limit, or capacity. A storage container might be a disk partition or an entire physical device, limited by its size. A processing container might be a CPU, a set of CPUs, or a specific type of server. The limit might be some number of instructions or transactions per unit time. A network container could be an interface, or the network itself, and the limit could be the bandwidth. In any case, the resource has a limit (capacity) which cannot be exceeded without external intervention. Attempts to exceed the capacity of a container will result in degraded performance or failure.

A processing environment is a collection of processing systems that are capable of executing the workload for any of the workload units executing within the environment. The administrative processor has access to the storage subsystem(s) in its storage environment. Through the storage subsystem, it can identify all of the containers in each subsystem, the limits of those containers, the identity of all of the objects in each container, and the resource usage of each object.

A threshold is an artificial limit on utilization that is used by the capacity planning process to prioritize containers that need action. When the projected utilization of a container reaches the threshold, the container is selected to be managed and action will be taken to prevent or alleviate the resource shortage in that container.

The life expectancy of a processing system is the period of time from the last measurement of the system until the increase in resource consumption is expected to exceed the capacity of nay one of the system's resources. If the change in resource consumption over time is non-positive and the system is operating below its capacity limit, then the life expectancy of the system is considered infinite. If the resource consumption exhibits positive growth for any system resource dimension, the life expectancy of the system is finite.

In addition, the present invention introduces the following new concepts:

The life expectancy of a set of resources in a system forms an N-dimensional space called a capacity space. Each resource R1 ... Rn corresponds to a dimension in the space, and the units on all axes are in time. A processing system S can be mapped into a point in the capacity space PS= (LS1, ... LSn), where LSi is the life expectancy of resource Ri for S. Capacity space normalizes configuration and capacity differences between processing systems in a processing environment by expressing the usage of all resources in units of time.

A critical resource is a resource whose life expectancy is less than or equal to the life expectancies of all other resources for that processing system, CLS=min(LS1, ..., LSn). The resource needs of this system must be addressed in time CLS. Because all of the resources are represented in units of time, an arbitrary number of dimensions can be collapsed into one in this way.

A system with multiple resources is balanced with respect to life expectancy if all of its resources have the same life expectancy. Otherwise, the system is unbalanced. The life expectancy of an unbalanced system is the minimum life expectancy over all of its resources. Balanced systems fall on a line in the space drawn from the origin through (n, n, n, ..., n), for some constant n, where the size of the tuple is the number of resources or dimensions.

Non-critical resources in a processing system are said to have slack beyond the critical resource, ESi=LSi−CLS. Slack represents available resources that could be reallocated under the present invention.

A capacity space for two resources is shown in FIG. 1. The resources are disk storage and CPU capacity. The circle at 110 represents a processing system in which the system is unbalanced since disk storage is expected to suffice for 20 days, and the CPU capacity is expected to suffice for 60 days. The circle at 112 represents a balanced processing system in which both resources are expected to run out in 40 days. In FIG. 1, the critical resource for the processing system represented by the circle at 110 is storage; while for the balanced processing system represented by the circle at 112, both resources are equally critical. Furthermore, in FIG. 1, the processing system represented by the circle at 110 has 40 days of slack in its CPU resource.

Figure 2:
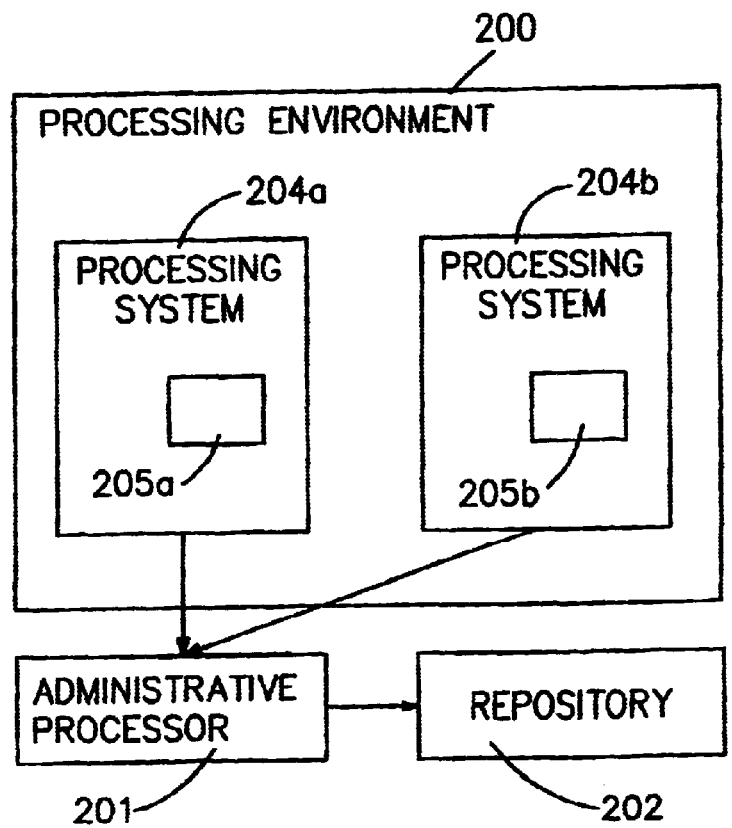
FIG. 2 illustrates a processing environment for implementing the present invention.

With reference to FIG. 2, a processing environment where this invention would apply is represented wherein the administrative processor 201 is adapted to implement the inventive process. The administrative processor 201 has access to a data repository 202, such as a relational database, where the data can be saved and from which data can be retrieved. The administrative processor also has access to configuration data about properties of the processing environment 200, comprising processing systems 204a and 204b, and about workloads needs and workload usage history data relating to the workload units 205a and 205b that are part of the processing environment.

The objects of interest for this invention are processing systems 204a and 204b that manage workload units. An example of work which is to divided up into workload units to be managed by the respective processing systems is a sort program run on behalf of a computer user. Each workload unit has a unique identifier, within the processing environment. Workload units consume resources of the processing systems. The resources consumed by a workload unit are recorded by the processing system and the record of this consumption is transferred as workload usage history to the administrative processor 201 and stored in the repository 202. Each resource has its own unit of measure. These consumption records are identified by the name of the workload unit and the time period of the consumption.

Figure 3:
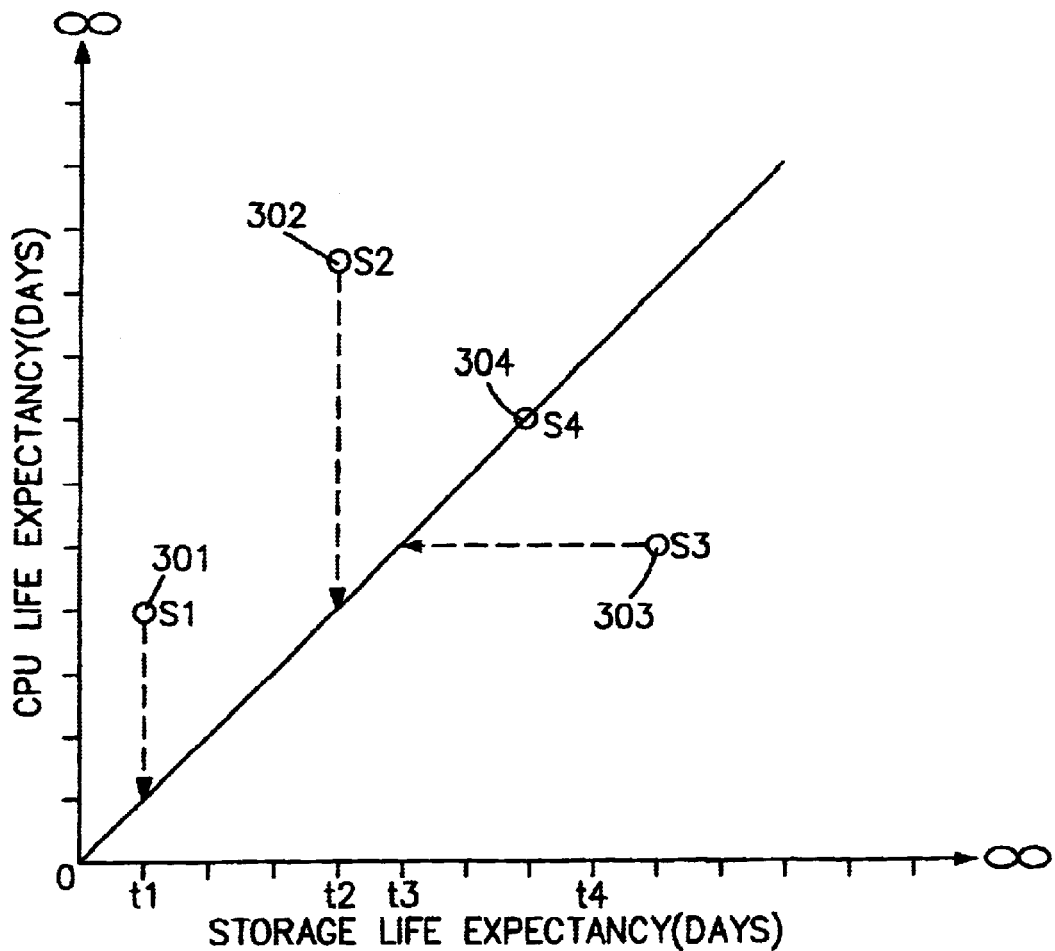
FIG. 3 provides a graph representatively mapping the capacity spaced based on the life expectancies of resources in a processing environment.

The administrative processor of the present invention utilizes a list of resources in the processing environment, $R=\{R1 \ldots Rn\}$; a list of processing systems in the processing environment, $S=\{S1 \ldots Sk\}$; for each processing system Si, its resource capacities $CSi=\{CR1 \ldots CRn\}$, and the workload usage histories stored in repository 202. Once the administrative processor, 201 of FIG. 2, gathers the foregoing information, it constructs a capacity space based on the life expectancy of the resources in the processing environment. FIG. 3 provides an illustration of a two-dimensional capacity space with the CPU life expectancies defined along one axis and the storage life expectancies along the other axis. Under the present invention, a N-dimensional space can be created for N different resources. For purposes of ease of illustration, however, the 2-dimensional space is illustrated and described.

In FIG. 3, a critical resource line is defined at 45°. For a balanced system, such as S4, which is plotted at graph point 304, the life expectancies of its resources are equal (80 days) and the graph point necessarily falls on the critical resource line. All of the other systems which are plotted in FIG. 3, S1, S2, and S3, represent unbalanced systems for which one resource has a shorter life expectancy than the other system resource. For the system S1, plotted at 301, the storage life expectancy of 10 days is significantly shorter than is the system's CPU life expectancy (40 days). System S2, plotted at 302, has a storage life expectancy of 40 days while its CPU life expectancy is 100 days. System S3, plotted at 303, unlike the others has a shorter CPU life expectancy (50 days) than it has a storage life expectancy (100 days).

The invention next determines the critical resource for each of the processing systems. Be defining the critical resource as that resource having the shortest life expectancy, clearly the critical resource for S1 is the storage and the critical action time for addressing the need of System S1, defined as t1, is 10 days. The next critical action time identified by the administrative processor 201 in this exercise is time t2 which is the life expectancy (40 days) of the critical resource of storage for system S2. Time t3 is defined as the critical actions time for system S3, since that time t3 (50 days) is the life expectancy for the critical CPU resource for S3. Finally, time t4 is the time defined to take action for system S4, at which time (80 days) the life expectancy of both critical resources for the balanced system will be reached.

Figure 4:
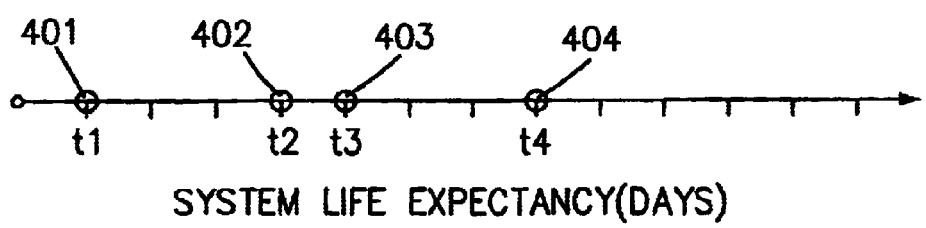
FIG. 4 illustrates a representative critical action timeline for action by the administrative processor of the present invention.

Taking the minimum resource life expectancy for each system, from FIG. 3, the administrative processor projects each processing system, S1–S4, onto a timeline at the life expectancy of its most critical resources, CLSi. FIG. 4 illustrates a timeline on which the critical action times t1 through t4 are plotted at points 401–404. Each system's life expectancy is plotted along the time line for use by the administrative processor 201 in prioritizing system reconfigurations and upgrades. The timeline prioritizes the systems in terms of resource needs, establishes a minimum time in which action must be taken (min CLSi or t1 as illustrated), and creates a timetable for action (CLS1 . . . CLSn).

Figure 5:
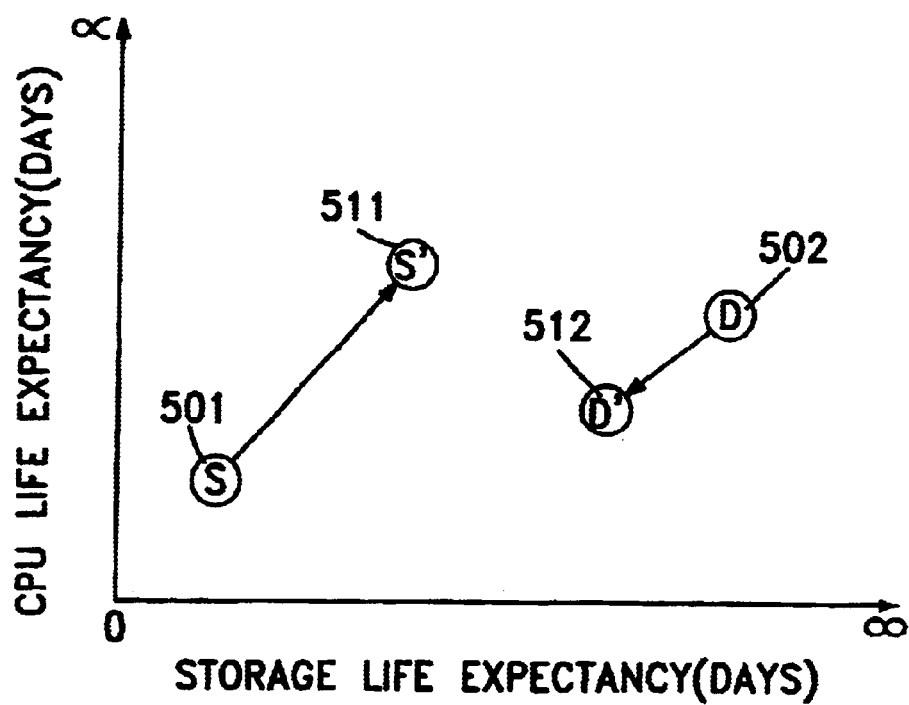
FIG. 5 shows the effect of shifting the workload from system S to system D on the capacity space.
Figure 6:
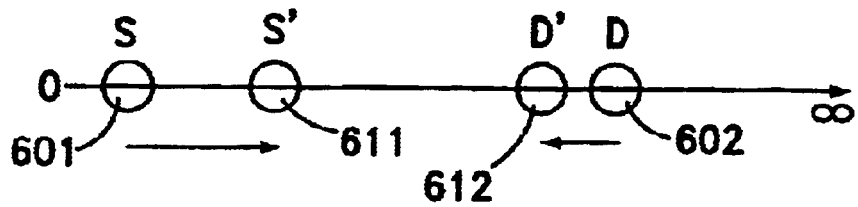
FIG. 6 shows the effect of shifting the workload from system S to system D on a critical action timeline.

The slack in the systems Si, which is recognized through the plotting of capacity space for each processing system, can be used to redistribute workload in a way that extends the life expectancy of critical resources, and therefore the processing systems and the processing environment as a whole. Once the systems are ordered and a timeline is created, workload units may be shifted between more critical and less critical systems to alleviate resource shortages and to utilize slack more effectively. This shifting translates to movement of the systems in capacity space and on the critical resource line. FIG. 5 illustrates the shifting of points plotted in the capacity space due to workload changes. For example, if it has been recognized that system S has a critical action time which is very short, some workload is removed from so-called source system S, which may extend the life expectancy of one or more resources, moving it away from the original point 501 to point 511, shown as S'. When the workload is placed on another so-called destination system D, the shift may decrease the life expectancy of the system D resources, moving from 502 to 512, shown in D'. Note that because the resource capacities and current usage of S and D may differ, the increase in life expectancy on S may not be equal to the decrease in life expectancy on D for a given resource. FIG. 6 shows the effect of shifting the workload from source system S to destination system D on the critical resource line (or the critical action timeline), with time 601 shifting back to 611 for source system S while time 602 shifts forward to 612 for destination system D.

A wide variety of existing algorithms can be used to balance resources by shifting workload between them and moving them in capacity space. Without precluding the use of any other such algorithm, a representative prioritization procedure and two representative workload reallocation procedures are set forth in detail below.

Figure 7:
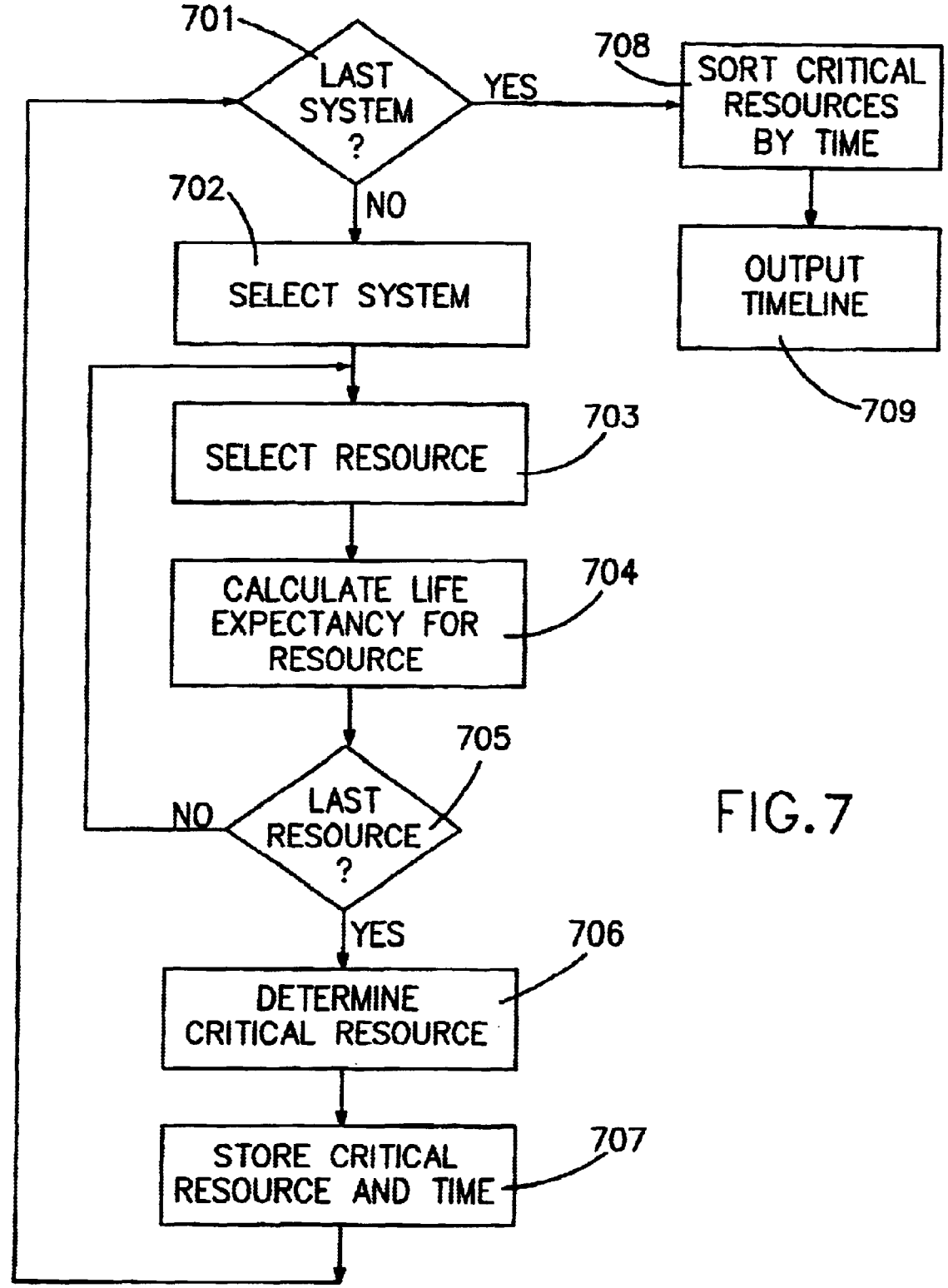
FIG. 7 shows a process flow for a workload prioritization procedure for use with the present invention.

FIG. 7 shows a flowchart for a prioritization procedure which may be used in conjunction with the present invention. The output of the procedure is a list of systems, or containers, identifying their critical resource, and sorted on the times at which they are expected to expire. When the administrative processor has retrieved the list of systems from the repository, along with the list of resources, the administrative processor begins iterating through the systems Si, selecting them one at a time for review and analysis. At step 702 a system is selected followed by selecting a resource at step 703. The life expectancy for each resource is calculated at step 704. This process is repeated until the life expectancy for every resource in a given processing system has been determined. If it is determined at step 705 that there are no other resources in the processing system to be evaluated, the administrative processor then determines the critical resource for the system at 706 as the resource having the minimum life expectancy, and stores the critical resource and its critical time at step 707. Next the administrative processor checks to see if all systems have been evaluated. If not, another system is selected, its resources are analyzed and its critical resource and critical time are stored, as above. If all systems have been evaluated, then the stored critical resource and critical time data are retrieved and sorted by time at step 708. Finally, a timeline is output at 709 which represents the timetable for action described above.

An alternative method, based on a graph of the capacity space, is as follows:

1. Construct the capacity space
2. Plot the critical resource line
3. Plot the points in the capacity space
4. Project the points onto the critical resource line at the life expectancy of their critical resource
5. Traverse the critical resource line starting at time 0, and output the location of the points on the critical resource line in order.

Figure 8:
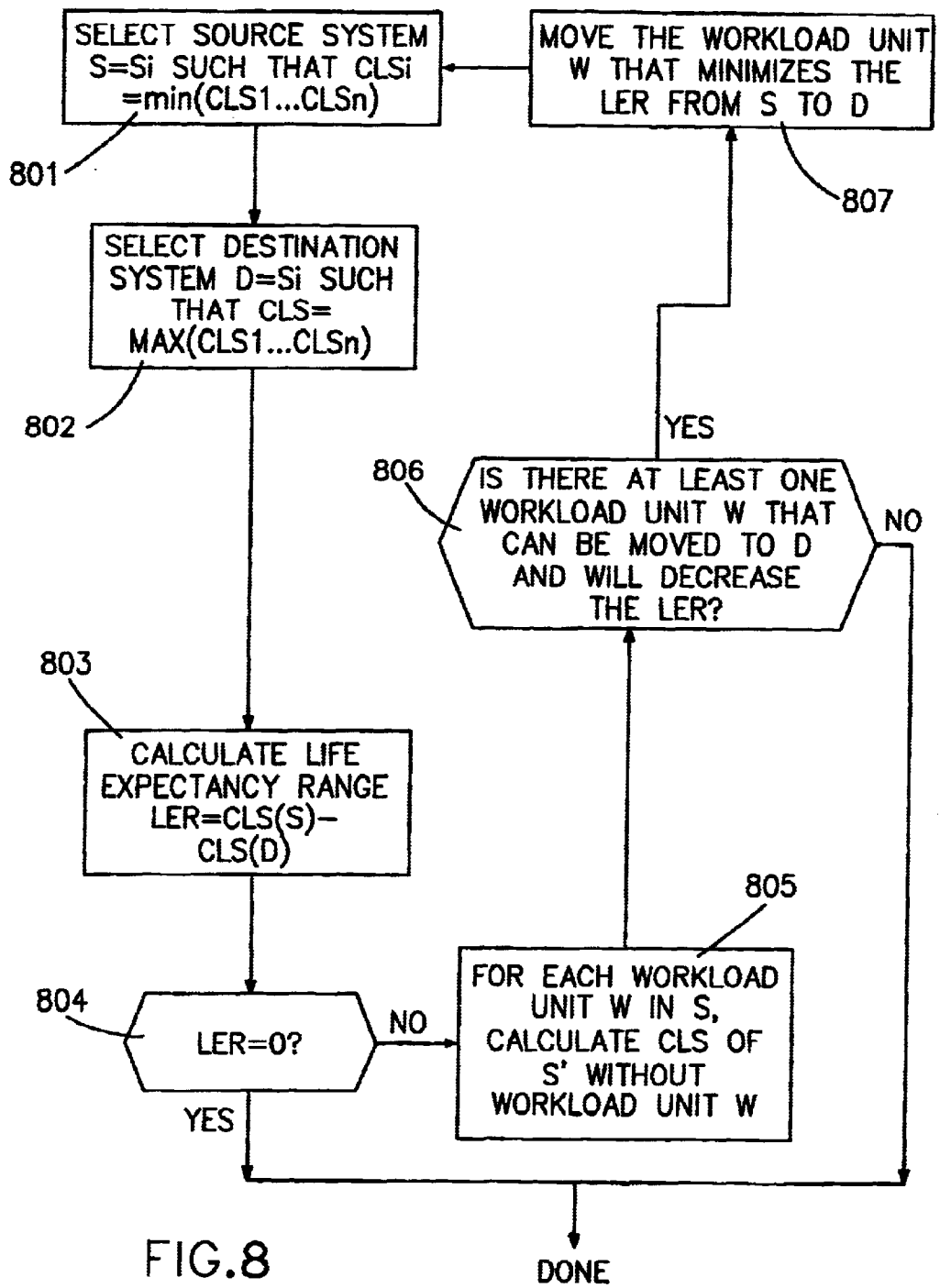
FIG. 8 shows a process flow for one reallocation procedure for use with the present invention.

FIG. 8 shows one reallocation procedure that balances the life expectancies of the computer systems. In the capacity space, the reallocation could mean moving the points towards some "center of gravity", with an objective of minimizing the range of system life expectancies (or some other measure of dispersion). The center of gravity algorithm shown is a greedy method. The procedure begins with step 801, which selects the most critical system S, that is the system with the lowest life expectancy, or the leftmost system on the timeline produced by the prioritization procedure of FIG. 7. This system will be the source of the workload to be moved. Step 802 selects a destination for the workload D, which is the least critical system, or the rightmost system on the timeline. Step 803 calculates the range of the life expectancies LER of S and D. This is a measure of how well the set of systems is balanced. Step 804 checks if the LER=0, in which case the systems are perfectly balanced and the procedure exits. If not, step 805 calculates the impact of removing each workload unit W from S on the life expectancy of S, CLS. Step 806 determines if there is a workload unit W that can be moved to D, and in doing so will decrease the LER. If there is, step 807 selects workload unit W that will yield the most improvement in the LER, and the procedure starts anew with step 801. If there is not, the procedure exits.

Figure 9:
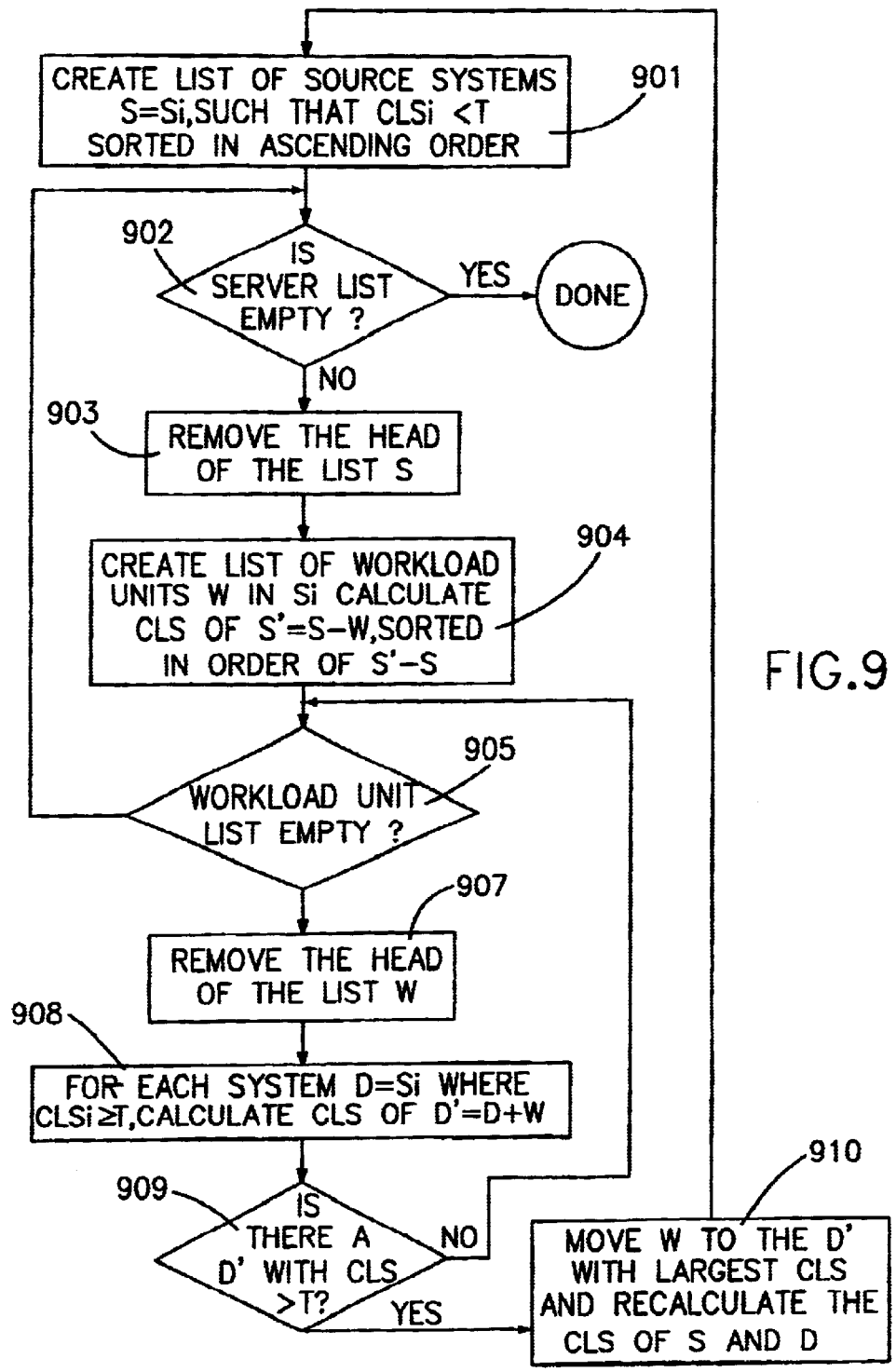
FIG. 9 shows a process flow for an alternative reallocation procedure for use with the present invention.

An alternative reallocation approach can establish some minimum life expectancy for all of the system. The objective then is to move the systems which are below some minimum threshold T to above T, if possible. It is to be noted that, for example, if all of the systems fall below T, there is no feasible solution without adding capacity. A greedy algorithm with the foregoing objective is shown in FIG. 9. Step 901 creates a set of systems from which workload will be moved, namely, those whose life expectancy falls below T. The list of source systems is sorted in order of ascending life expectancy, that is, most critical system first. If in step 902 there are no such systems, the procedure exits. Otherwise, step 903 selects the most critical system. Step 904 calculates for each workload unit W in S, the life expectancy of S', which is the life expectancy of S if W were removed from S. It creates a list of workload units with the associated life expectancy of S', sorted in descending order by S'–S, so that the workload unit with the most impact is at the head of the list. If the list is non-empty (step 905), the procedure removes the head of the list (step 906), and tries to find a destination for it (step 907). If there is a destination D such that the life expectancy of D with the addition of W is still greater than threshold T (step 908), then step 909 selects the D that would have the largest life expectancy after the addition of W, moves W from S to D, and recalculates the life expectancies of S and D. The procedure then continues with step 901. Note that even if the procedure exits leaving some systems with life expectancies below T, the workload it has moved in the process may extend the life expectancy of the system as a whole.

Many variations of these procedures are possible. For example, a threshold based procedure such as the one in FIG. 9 could have an additional objective of keeping the systems as far above T as possible, in other words, maximizing the sum of LifeExpectancy (S)-T for all systems S.

Projecting resource usage with respect to some limit is a well-known part of capacity planning. However, under the present invention, as set forth in the appended claims, a new approach provides for the representation of a system's capacity in units of time (i.e., the life expectancy of its resources), which normalizes different resources and resource capacities; for the creation of an N-dimensional capacity space in which each dimension is the life expectancy of some resource, and the representation of systems as points within that space; for the reduction of multiple dimensions of capacity of a system into a single dimensions, which inherently represents the critical resource for that system; for the recognition of a balance line that distinguishes between balanced and unbalanced systems, that allows systems to be ordered in terms of their most critical resource and that identifies available resources in unbalanced systems; and, for the representation of workload in units of time, relative to other workload assigned to a system; and the adaptation of all of the above to changes in workload residing on a system.

While the invention has been detailed with reference to several preferred embodiments, it is to be understood that modifications can be introduced without departing from the spirit and scope of the invention as set forth in the appended claims.

Having thus described our invention, what is claimed is:

1. A computer implemented method for projecting usage of computer resources for a plurality of processing systems in a processing environment comprising the steps of:

representing a plurality of capacities, one capacity for each system of said plurality of processing systems in units of time; and sorting the capacities of said plurality of processing systems from shortest to longest time, wherein said representing of the capacity for each system of said plurality of processing systems comprises:

calculating a plurality of resource life expectancies, one resource life expectancy for each of said resources;

identifying at least one critical resource having the shortest resource life expectancy of said plurality of resource life expectancies; and defining the life expectancy of the system as the resource life expectancy of the at least one critical resource.

2. The method of claim 1 further comprising altering workload on at least two of said plurality of processing systems to improve resource utilization.

3. The method of claim 2 further comprising reevaluating the usage of computer resources for the at least two of said plurality of processing systems.

4. The method of claim 1 wherein said representing further comprises plotting a life expectancy for each of N resources of each processing system in an N dimensional capacity space.

5. The method of claim 4 wherein said identifying at least one critical resource for each processing system comprises identifying the resource based on its location within the N dimensional capacity space.

6. The method of claim 4 further comprising identifying at least one available resource in said plurality of processing systems based on its location within the N dimensional capacity space.

7. The method of claim 5 further comprising identifying at least one available resource in said plurality of processing systems based on its location within the N dimensional capacity space.

8. The method of claim 7 further comprising balancing of workload from said at least one critical resource to said at least one available resource.

9. A system for projecting usage of computer resources for a plurality of processing systems in a processing environment comprising:
　at least one administrative processor comprising:
　　a normalizing component for representing a plurality of capacities, one capacity for each system of said plurality of processing systems in units of time; and
　　a sort component for sorting the capacities of said plurality of processing systems from shortest to longest time,
　wherein said normalizing component comprises:
　　a calculating component for calculating a plurality of resource life expectancies, one resource life expectancy for each of said resources;
　　an identifier component for identifying at least one critical resource having the shortest resource life expectancy of said plurality of resource life expectancies; and
　　a definitional component for defining the life expectancy of the system as the resource life expectancy of the at least one critical resource.

10. The system of claim 9 wherein said sort component comprises means for sorting the capacities based on life expectancy.

11. The system of claim 9 further comprising processing means for applying a reallocation algorithm to adjust workload among said plurality of processing systems.

12. The system of claim 11 wherein said normalizing component comprises means for plotting a life expectancy for each of N resources of each processing system in an N dimensional capacity space.

13. The system of claim 12 wherein said processing means further comprises means for identifying at least one of a critical resource and an available resource for each processing system based on its location within the N dimensional capacity space.

14. A program storage device readable by machine, tangibly embodying a program of instructions executable by the machine to perform method steps for projecting usage of computer resources for a plurality of processing systems in a processing environment, said method comprising the steps of:
　representing a plurality of capacities, one capacity for each system of said plurality of processing systems in units of time; and
　sorting the capacities of said plurality of processing systems from shortest to longest time,
　wherein said representing of the capacity for each system of said plurality of processing systems comprises:
　calculating a plurality of resource life expectancies, one resource life expectancy for each of said resources;
　identifying at least one critical resource having the shortest resource life expectancy of said plurality of resource life expectancies; and
　defining the life expectancy of the system as the resource life expectancy of the at least one critical resource.

15. The program storage device of claim 14 wherein said representing comprises plotting a life expectancy for each of N resources of each processing system in an N dimensional capacity space.

16. The program storage device of claim 15 further comprising identifying at least one of a critical resource and an available resource for each processing system based on its location within the N dimensional capacity space.

* * * * *